United States Patent
Izuru et al.

(10) Patent No.: US 11,858,581 B2
(45) Date of Patent: Jan. 2, 2024

(54) DETECTING SYSTEM

(71) Applicant: Shimano Inc., Osaka (JP)

(72) Inventors: Yuji Izuru, Osaka (JP); Kenta Kawakami, Osaka (JP); Noriyuki Kai, Osaka (JP); Mao Kuroda, Osaka (JP); Yuuka Miyanaga, Osaka (JP)

(73) Assignee: Shimano Inc., Osaka (JP)

( * ) Notice: Subject to any disclaimer, the term of this patent is extended or adjusted under 35 U.S.C. 154(b) by 164 days.

(21) Appl. No.: 17/533,505

(22) Filed: Nov. 23, 2021

(65) Prior Publication Data

US 2023/0159125 A1 May 25, 2023

(51) Int. Cl.
*B62J 45/421* (2020.01)
*B62J 50/22* (2020.01)
*B62J 45/415* (2020.01)

(52) U.S. Cl.
CPC ......... *B62J 45/421* (2020.02); *B62J 45/415* (2020.02); *B62J 50/22* (2020.02)

(58) Field of Classification Search
None
See application file for complete search history.

(56) References Cited

U.S. PATENT DOCUMENTS

| | | |
|---|---|---|
| 5,027,303 A | 6/1991 | Witte |
| 9,010,201 B2 | 4/2015 | Kodama et al. |
| 9,581,508 B2 | 2/2017 | Tetsuka et al. |
| 10,475,303 B2 | 11/2019 | Tetsuka |
| 2005/0233866 A1* | 10/2005 | Miyamaru ......... A63B 22/0605 434/61 |
| 2009/0120210 A1 | 5/2009 | Phillips et al. |
| 2010/0024590 A1 | 2/2010 | O'Neill et al. |
| 2013/0210583 A1 | 8/2013 | Kametani et al. |
| 2014/0060212 A1 | 3/2014 | Tetsuka et al. |
| 2014/0200835 A1 | 7/2014 | Carrasco Vergara |
| 2015/0120119 A1 | 4/2015 | Tauchi et al. |
| 2016/0041051 A1* | 2/2016 | Smit ...................... G01L 23/24 700/91 |
| 2016/0052583 A1 | 2/2016 | Sasaki |
| 2017/0050080 A1* | 2/2017 | Mizuochi ............... G16H 20/30 |
| 2017/0295319 A1* | 10/2017 | Komemushi .......... H04N 5/265 |
| 2018/0178870 A1* | 6/2018 | Takeshita ................ B62J 50/22 |
| 2018/0268668 A1* | 9/2018 | Tetsuka .................... G01D 5/14 |
| 2018/0334216 A1* | 11/2018 | Montez .................. B62J 50/225 |
| 2022/0413101 A1* | 12/2022 | Klamkin ............... H01L 31/105 |

FOREIGN PATENT DOCUMENTS

| | | |
|---|---|---|
| WO | 2012/056510 A1 | 5/2012 |
| WO | 2012056522 A1 | 5/2012 |

OTHER PUBLICATIONS

Rodrigo R. Bini et al.; Measuring Pedal Forces, Chapter 2; pp. 13-21; Springer International Publishing Switzerland 2014.

* cited by examiner

*Primary Examiner* — Daniel L Greene
(74) *Attorney, Agent, or Firm* — Global IP Counselors, LLP

(57) ABSTRACT

A detecting device is provided for detecting a condition of a bicycle crank assembly including a bicycle crank provided to a bicycle frame. The detecting device includes an electronic controller. The electronic controller is configured to obtain information relating to an image of the crank. The electronic controller is configured to determine an angle of the crank based on the information.

24 Claims, 13 Drawing Sheets

DETECTING SYSTEM

BACKGROUND

Field of the Invention

This invention generally relates to a detecting system. More specifically, the present disclosure relates to a detecting system to be implemented with a bicycle crank assembly.

Background Information

Bicycles are sometimes equipped with various sensors for providing information to a rider and/or for providing information to a controller to control various aspects of the bicycle, such as shifting or suspension stiffness. For example, pedaling force detectors typically use strain gauges to measure pedaling force during pedaling. These pedaling force detectors are sometimes disposed a bicycle crank assembly such as disclosed in U.S. Pat. No. 9,581,508 (assigned to Shimano). Sensor circuits may be configured to process the pedaling force information detected by the strain gauges and transmit this information so that it is received by the rider.

SUMMARY

In view of the state of the known technology and in accordance with a first aspect of the present disclosure, a detecting device is provided for detecting a condition of a bicycle crank assembly including a bicycle crank provided to a bicycle frame. The detecting device includes an electronic controller. The electronic controller is configured to obtain information relating to an image of the crank. The electronic controller is configured to determine an angle of the crank based on the information.

With the detecting device according to the first aspect, the user can easily determine the angle of the crank using the detecting device.

In accordance with a second aspect of the present disclosure, the detecting device according to the first aspect is configured so that the detecting device further comprises an inclinometer configured to detect an inclination angle of the crank. The electronic controller is configured to determine the angle of the crank based on the information relating to the image and the inclination angle.

With the detecting device according to the second aspect, the user can easily determine the angle of the crank using the detecting device.

In accordance with a third aspect of the present disclosure, the detecting device according to the first aspect is configured so that the electronic controller is configured to detect an inclination angle of the crank and define a reference line based on the image. The electronic controller is configured to determine the angle based on the reference line and the inclination angle.

With the detecting device according to the third aspect, the detecting system can provide the user with alternative options to easily determine the angle of the crank using the detecting device.

In accordance with a fourth aspect of the present disclosure, the detecting device according to any of the first to third aspects is configured so that the detecting device further comprises a camera configured to capture the image of the crank with respect to the bicycle frame.

With the detecting device according to the fourth aspect, the user can easily determine the angle of the crank using the detecting device.

In accordance with a fifth aspect of the present disclosure, the detecting system according to any of the first to third aspects is configured so that the detecting device further comprises a light detection and ranging detector configured to obtain the information relating to the image.

With the detecting system according to the fifth aspect, the detecting system can provide the user with alternative options to easily determine the angle of the crank using the detecting device.

In accordance with a sixth aspect of the present disclosure, the detecting system according to any of the fourth or fifth aspects is configured so that the detecting device further comprises a first storage configured to store at least one reference image of the crank. The detecting device further comprises an electronic display configured to concurrently display the at least one reference image and a live image of the crank prior to capture the image of the crank.

With the detecting system according to the sixth aspect, the detecting system can provide the user with alternative options to easily determine the angle of the crank using the detecting device.

In accordance with a seventh aspect of the present disclosure, the detecting system according to any of the fourth or sixth aspects is configured so that detecting device further comprises a first storage configured to store a plurality of reference images at least including an outer shape of the crank respectively. The detecting device further comprises an electronic display configured to display at least one of the plurality of the reference images. The electronic controller is configured to control the electronic display to display a first reference image selected from the plurality of reference images.

With the detecting system according to the seventh aspect, the user can easily determine the angle of the crank using the detecting device.

In accordance with an eighth aspect of the present disclosure, a detecting system for the bicycle crank assembly according to any of the first to seventh aspects is configured so that the detecting system comprises the detecting device according to the first aspect. The detecting system further comprises a sensor provided to the crank. The sensor is configured to detect an object provided to the bicycle frame in a detecting state where the crank is arranged at a predetermined position with respect to the bicycle frame. The detecting device is configured to determine an inclination angle of the crank in detecting state.

With the detecting system according to the eighth aspect, the user can easily position the crank to the predetermined position.

In accordance with a ninth aspect of the present disclosure, the detecting system according to the eighth aspect is configured so that the detecting system further comprises a second storage provided to the crank assembly. The detecting device is configured to transmit the inclination angle to the second storage device. The second storage is configured to store the inclination angle transmitted by the detection device as a reference angle.

With the detecting system according to the ninth aspect, the user can easily access the reference angle.

In accordance with a tenth aspect of the present disclosure, the detecting system according to any of the eighth or ninth aspects is configured so that the detecting system further comprises an electronic indicator configured to indicate that the crank is in the predetermined position.

With the detecting system according to the tenth aspect, the user can easily determine the predetermined position.

In accordance with an eleventh aspect of the present disclosure, the detecting system according to any of the eighth to tenth aspects is configured so that the detecting system further comprises a wireless communicator. The wireless communicator is in electronic communication with the detecting device so as to transmit a signal to the detecting device. The signal indicates that the crank is in the predetermined position.

With the detecting system according to the eleventh aspect, the user can easily determine the predetermined position.

In accordance with a twelfth aspect of the present disclosure, the detecting system according to any of the eighth to eleventh aspects is configured so that the detecting device is configured to automatically determine the inclination angle upon receiving the signal.

With the detecting system according to the twelfth aspect, the user can easily determine the angle of the crank using the detecting device.

In accordance with a thirteenth aspect of the present disclosure, a method for detecting a condition of a bicycle crank assembly including a bicycle crank provided to a bicycle frame is configured so that the method comprises detecting a detecting state where the crank is arranged at a predetermined position with respect to the bicycle frame. The method further comprises obtaining an information relating to an image of the crank with respect to the bicycle frame using a detecting device in a detecting state. The detecting state is where the crank is arranged at a predetermined position with respect to the bicycle frame. The method further comprises measuring an inclination angle of the crank using the detecting device based on the information.

With the method according to the thirteenth aspect, the user can easily determine the angle of the crank using the detecting device.

In accordance with a fourteenth aspect of the present disclosure, the method according to the thirteenth aspect further comprises detecting the predetermined position using a sensor provided to the bicycle crank assembly.

With the method according to the fourteenth aspect, the user can easily position the crank to the predetermined position.

In accordance with a fifteenth aspect of the present disclosure, the method according to any of the thirteenth or fourteenth aspects further comprises receiving an indication from an electronic indicator. The indication indicates that the crank is in the predetermined position. The predetermined position is a position in which the electronic indicator generates the indication.

With the method according to the fifteenth aspect, the user can easily determine the predetermined position.

In accordance with a sixteenth aspect of the present disclosure, the method according to the fifteenth aspect further comprises using the detecting device to access a reference image of the crank after receiving the indication.

With the method according to the sixteenth aspect, the user can easily determine the angle of the crank using the detecting device.

In accordance with a seventeenth aspect of the present disclosure, the method according to the fifteenth aspect is configured so that the reference image is accessed from a first storage of the detecting device.

With the method according to the seventeenth aspect, the user can easily determine the angle of the crank using the detecting device.

In accordance with an eighteenth aspect of the present disclosure, the method according to the seventeenth aspect further comprises comparing the reference image with a live image of the crank using the detecting device.

With the method according to the eighteenth aspect, the user can have alternative options to easily determine the angle of the crank using the detecting device.

In accordance with a nineteenth aspect of the present disclosure, the method according to any of the sixteenth to eighteenth aspects further comprises displaying the live image of the crank with the reference image concurrently on an electronic display provided to the detecting device.

With the method according to the nineteenth aspect, the user can easily determine the angle of the crank using the detecting device.

In accordance with a twentieth aspect of the present disclosure, the method according to any of the fourteenth to nineteenth aspects further comprises creating a reference indication for the detection device. The method further comprises measuring the inclination angle using the detecting device based on the information and the reference indication.

With the method according to the twentieth aspect, the user can have alternative options to easily determine the angle of the crank using the detecting device.

In accordance with a twenty-first aspect of the present disclosure, the method according to the twentieth aspect is configured so that creating the reference indication includes creating a reference line on an electronic display provided to the detecting device. The electronic display further displays a reference image of a bicycle outline concurrently with the live image of the crank. The reference line is created on the bicycle frame.

With the method according to the twenty-first aspect, the user can have alternative options to easily determine the angle of the crank using the detecting device.

In accordance with a twenty-second aspect of the present disclosure, the method according to the twenty-first aspect is configured so that creating the reference indication includes creating a reference line on an electronic display provided to the detecting device. The electronic display further displays a live image of a surrounding area concurrently with the live image of the crank. The reference line is created on the surrounding area.

With the method according to the twenty-second aspect, the user can have alternative options to easily determine the angle of the crank using the detecting device.

In accordance with a twenty-third aspect of the present disclosure, the method according to the fourteenth aspect further comprises accessing a light detection and ranging detector on the detecting device to measure the inclination angle of the crank.

With the method according to the twenty-third aspect, the user can have alternative options to easily determine the angle of the crank using the detecting device.

In accordance with a twenty-fourth aspect of the present disclosure, the method according to any of the fourteenth to twenty-second aspects further comprises transmitting the inclination angle to a second storage provided to the bicycle crank using the detecting device. The second storage configured to store the inclination angle as a reference angle.

With the method according to the twentieth aspect, the user can easily access the reference angle.

Also other objects, features, aspects and advantages of the disclosed detecting system will become apparent to those skilled in the art from the following detailed description, which, taken in conjunction with the annexed drawings, discloses one embodiment of the detecting system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
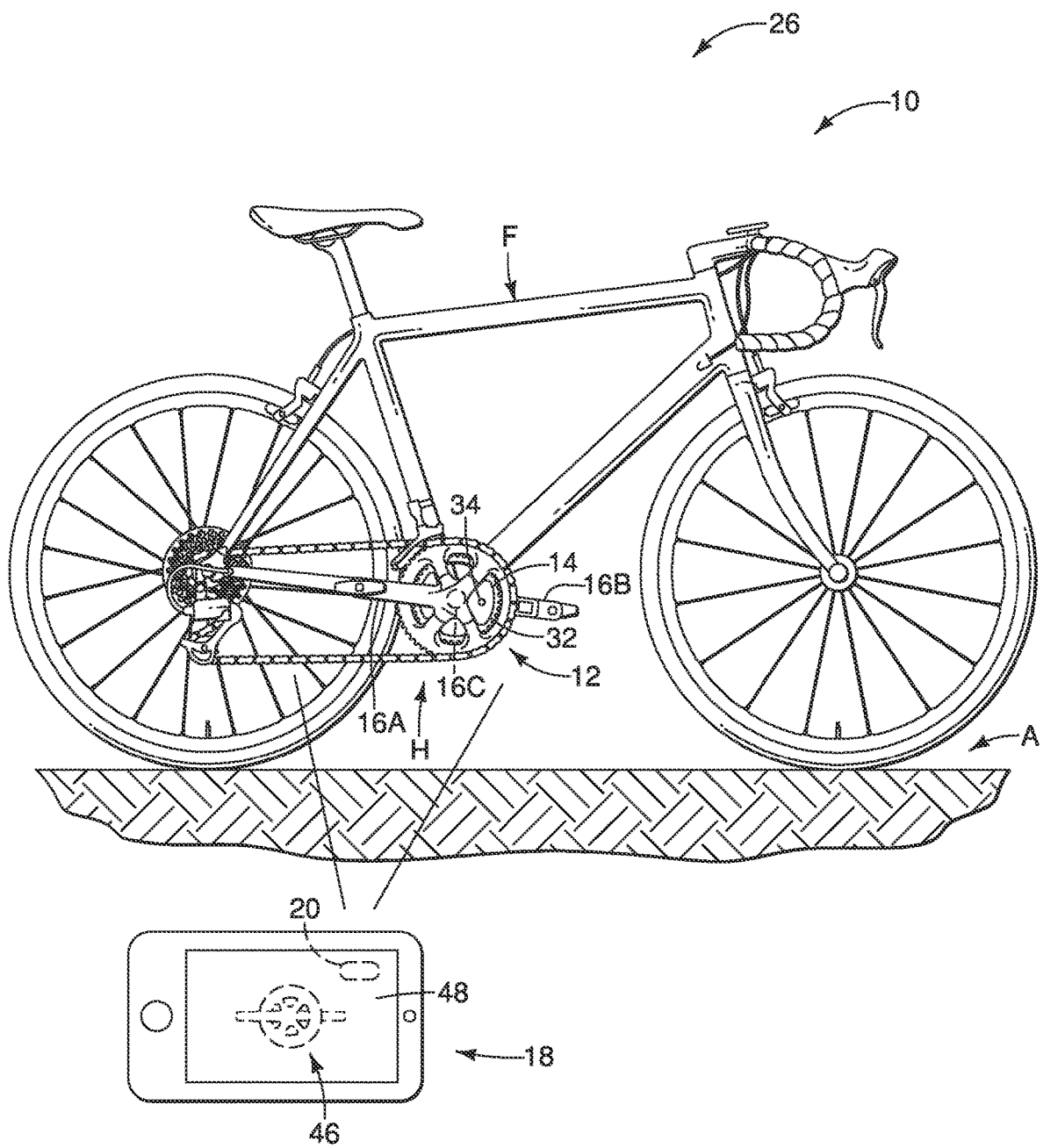
FIG. 1 is a side elevational view of a bicycle having a bicycle crank assembly that is equipped with a detecting device of a detecting system that captures information regarding the bicycle crank assembly in accordance with one illustrated embodiment.
Figure 2:
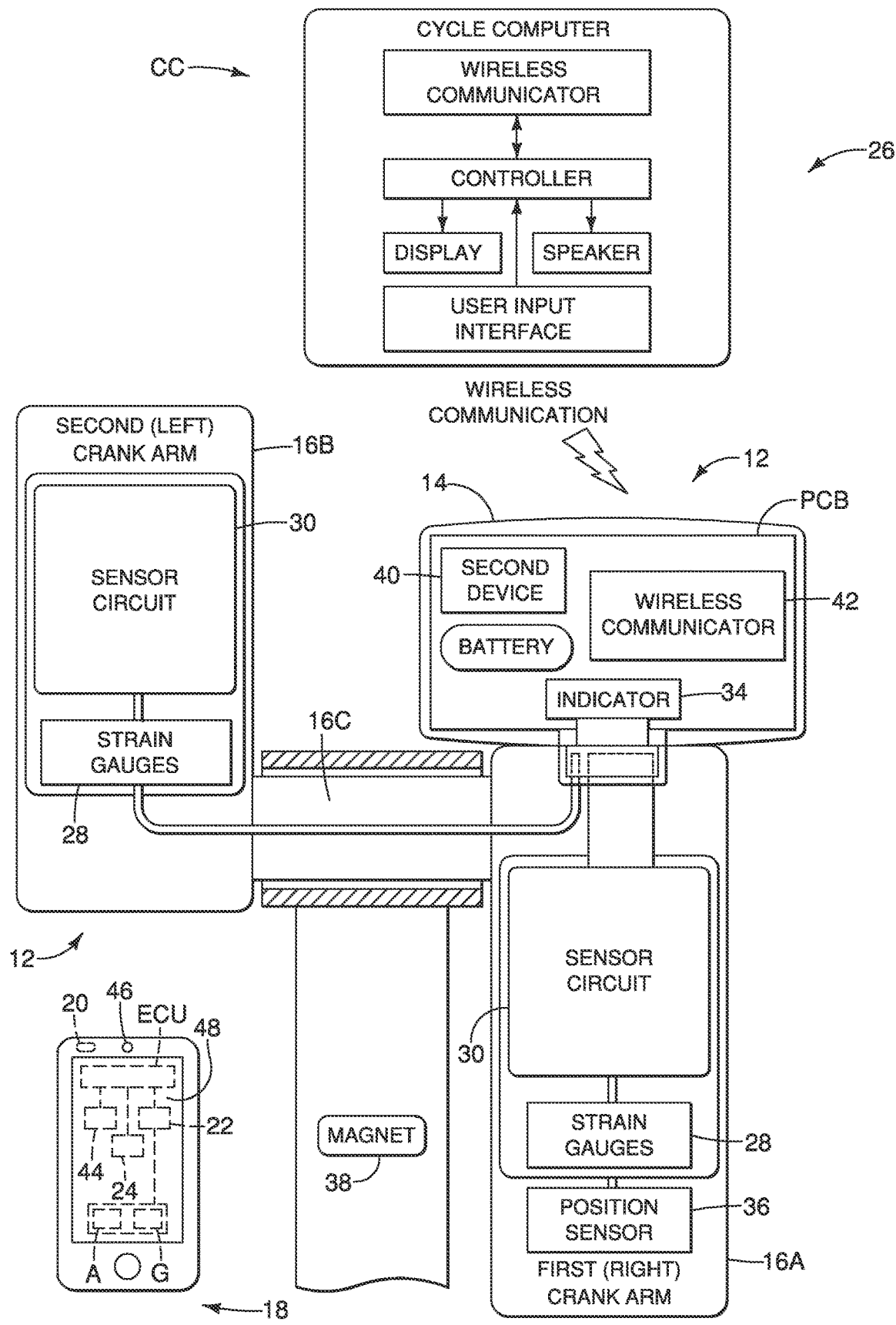
FIG. 2 is a block diagram of the bicycle crank assembly and the detecting system of FIG. 1.
Figure 3:
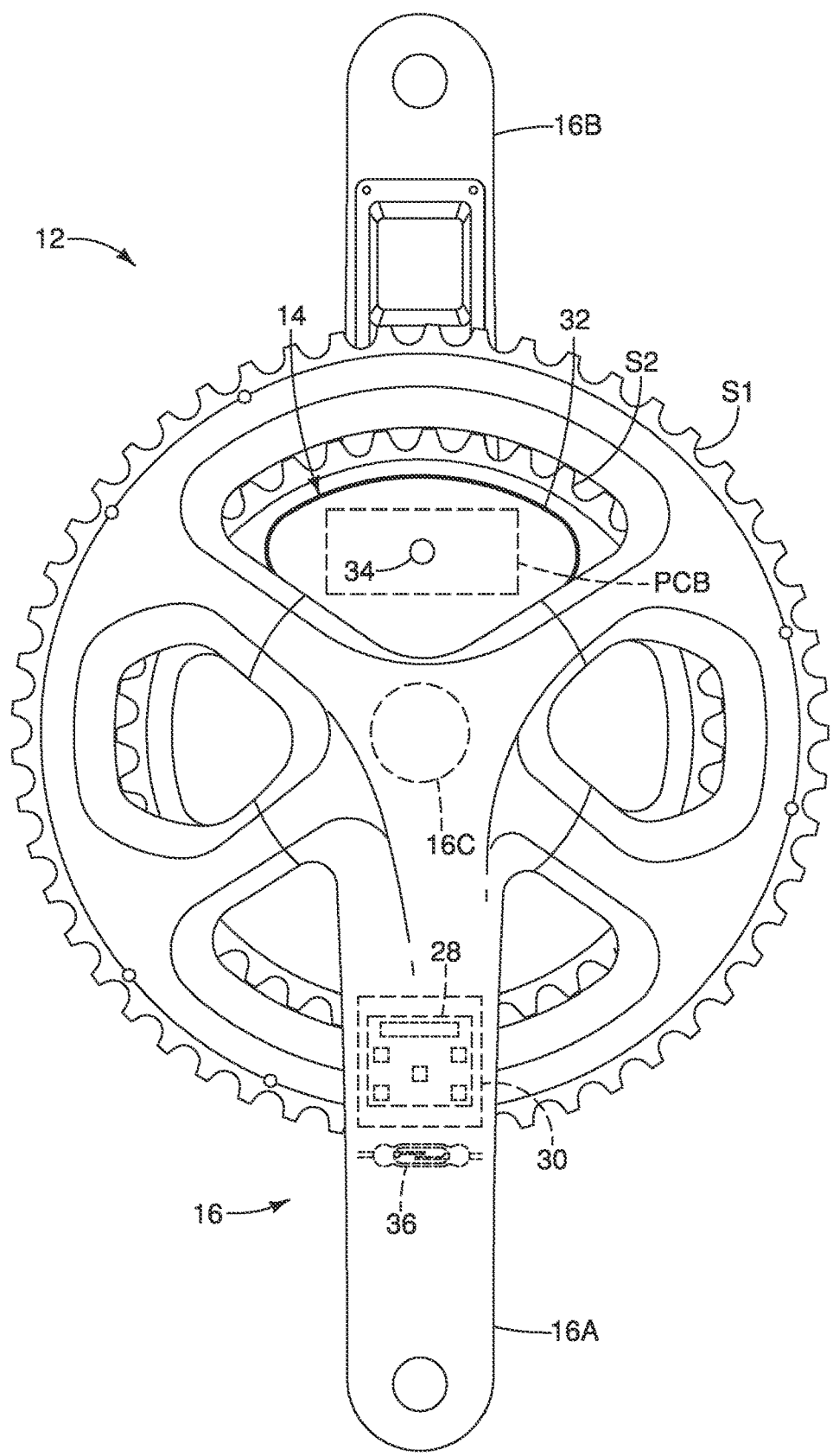
FIG. 3 is an outside elevational view of the bicycle crank assembly illustrated in FIGS. 1 and 2 with the an electronic indicator disposed on the crank arm.

Referring initially to FIGS. 1 to 3, a bicycle 10 is illustrated that is equipped with a bicycle crank assembly 12 having a bicycle electric device 14. As shown in FIG. 1, the bicycle 10 illustrated is a road style bicycle having various electrically-controlled components. Of course, it will be apparent to those skilled in the art from this disclosure that the bicycle crank assembly 12 and/or the bicycle electric device 14 can be implemented with other types of bicycles as needed and/or desired. The bicycle electric device 14 is provided to the bicycle crank assembly 12, and is configured to aid in determining a crank 16 angle of the bicycle crank assembly 12 as discussed below. The bicycle crank assembly 12 is rotatably mounted to a bicycle frame F in a conventional manner. The bicycle crank assembly 12 includes a bicycle crank 16 that is provided to a bicycle frame F of the bicycle 10.

As best seen in FIGS. 1 and 2, the bicycle 10 is further provided with a detecting device 18 for detecting a condition of the bicycle crank assembly 12. In the illustrated embodiment, the condition detected by the detecting device 18 includes an inclination state or an inclination angle of the bicycle crank assembly 12 that is installed on the bicycle 10, as will be further discussed below. Further, the detecting device 18 of the illustrated embodiment is an electronic detecting device 18 having an electronic controller ECU that is programmable with one or more processors for executing electronic operations, as seen in FIG. 2.

In particular, the detecting device 18 of the illustrated embodiment includes a camera 20 configured to manually or automatically capture an image of the bicycle with the bicycle components installed thereon. The camera 20 is also configured to capture an image of the nearby surrounding area A of the bicycle 10. The detecting device 18 of the illustrated embodiment further includes an inclinometer 22 configured to determine the condition of the bicycle crank 16 based on information captured by the camera 20. Additionally, the detecting device 18 of the illustrated embodiment further includes a first storage 24, as will be further discussed below.

In the illustrated embodiment, the bicycle 10 is provided with a detecting system 26 for the bicycle crank assembly 12. The detecting system 26 comprises the detecting device 18 that at least has the electronic controller ECU configured to obtain information relating to an image of the crank 16. That is, the electronic controller ECU is capable of processing the images captured by the camera 20 of the detecting device 18, as will be further described below. The electronic controller ECU is configured to determine the angle of the crank 16 (e.g., the condition of the crank 16 or the inclination angle) based on the information. The detecting system 26 can further include the bicycle crank assembly 12 that is provided to the bicycle 10.

Referring to FIGS. 2 and 3, the bicycle crank assembly 12 comprises, among other components, a first or right crank arm 16A, a second or left crank arm 16B and a crankshaft 16C. As seen in FIGS. 2 and 3, the first and second crank 16A and 16B arms and are rigidly connected by the crankshaft 16C. The crankshaft 16C is preferably made a hollow shaft. A bicycle pedal P is rotatably attached to each of the crank arms 16A and 16B. The first crank 16 includes a pair of bicycle sprockets S1 and S2. When a rider applies a force on the bicycle pedals P during riding, a pedaling force or a pedaling torque is transmitted to the first and second crank arms 16A and 16B. The first and second crank arms 16A and 16B rotate the bicycle sprockets S1 and S2 to move a bicycle chain BC and propel the bicycle 10 in a conventional manner. In the illustrated embodiment, the "bicycle crank 16" will refer to the bicycle 10 having either or both of the first and second crank arms 16A and 16B. For simplicity, the first and second crank arms 16A and 16B will simply be referred to as the "bicycle crank 16" in this disclosure.

As seen in FIG. 2, the bicycle crank assembly 12 can be equipped with a plurality of strain sensors 28 that are provided to the bicycle crank 16. The strain sensors 28 can be disposed and utilized in a similar manner as taught in U.S.

Patent Application Publication No. 2014/0060212 which also teaches various configurations of strain sensors 28 mounted to a crank. Alternatively, the strain sensors 28 can be disposed on the crankshaft 16C. For example, U.S. Patent Application Publication No. 2015/0120119 discloses mounting a strain sensor or torque sensor onto a crankshaft. As another alternative, the strain sensors 28 can be disposed on the bicycle pedal P that is provided with the bicycle crank assembly 12. For example, U.S. Patent Application Publication No. 2016/0052583 discloses various configurations of strain sensors that are disposed on a pedal spindle.

In the illustrated embodiment, the strain sensors 28 are connected to corresponding the sensor circuits 30 that are configured to interpret the strain signal(s) to generate pedaling force information that is transmitted to the cycle computer CC via the wireless communication device. The operation of the strain sensors 28 and the sensor circuits 30 can be similar to that described in U.S. Pat. No. 10,475,303 and will not be further described herein.

Figure 4:
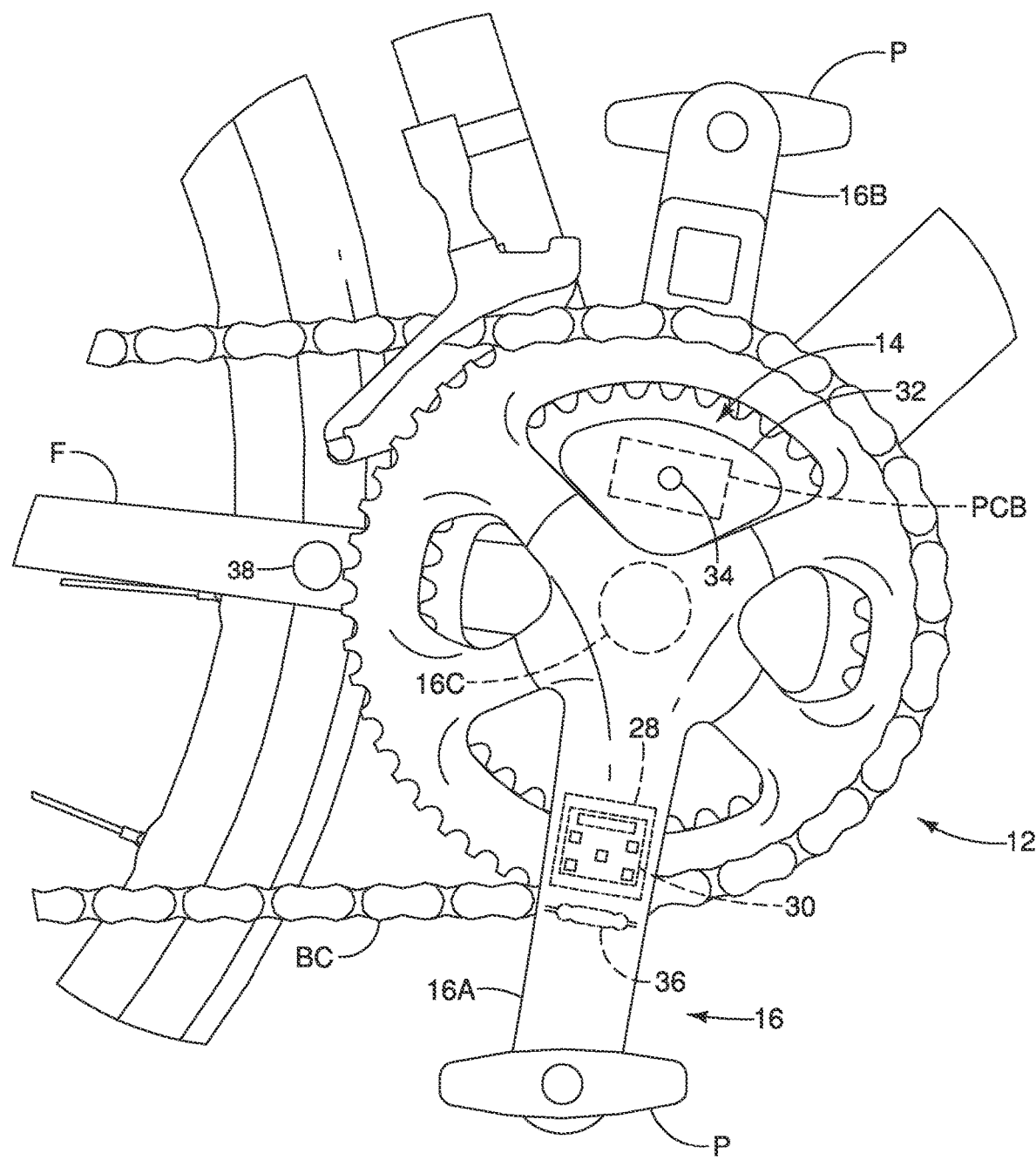
FIG. 4 is an enlarged side elevational view of a portion of the bicycle illustrated in FIG. 1 with a right crank arm of the bicycle crank assembly being in a non-detected position such that the electronic indicator is not producing a detection signal.

Referring to FIGS. 2 to 4, the detecting system 26 of the illustrated embodiment preferably further comprises the bicycle electric device 14 that is provided to the bicycle crank assembly 12. The electric device 14 includes a housing unit 32 that is detachably mounted to the crank 16. Alternatively, the housing unit 32 can be fixedly mounted to the crank 16. In the illustrated embodiment, the electric device 14 is disposed on a sprocket mounting portion of the crank 16. It will be apparent to those skilled in the art from this disclosure that the bicycle electric device 14 can be located on various locations of the crank 16 as needed and/or desired.

As discussed below, the bicycle electric device 14 comprises an electronic indicator 34 that is configured to generate a user signal indicating that the bicycle crank 16 is at a predetermined position, as will be discussed below. Therefore, the detecting system 26 further comprising the electronic indicator 34 configured to indicate that the crank 16 is in the predetermined position. Upon the crank 16 reaching the predetermined position, the detecting device 18 is configured to determine the inclination angle of the crank 16 when in the detecting state based on information relating to the image of the crank 16 that is captured by the camera 20.

As best seen in FIGS. 3 and 4, the bicycle electric device 14 further comprises a sensor 26 that is configured to be provided on the bicycle crank 16. Therefore, the detecting system 26 further comprises the sensor 26 that is provided on the crank 16. In the illustrated embodiment, the sensor is a position sensor 36 that is configured to detect an object (e.g., a magnet 38) that is provided to the bicycle frame F in a detecting state where the crank 16 is arranged at a predetermined position with respect to the bicycle frame F, as best seen in FIGS. 3 and 4. Further, as shown in FIG. 2, the bicycle electric device 14 further comprises the magnet 38 that is configured to be mounted on the bicycle frame F. The magnet 38 actuates the position sensor 36 to indicate that the crank 16 is in the predetermined position. The detecting device 18 determines the angle of the crank 16 when the crank 16 is in the predetermined position, as will be further discussed below. The electronic indicator 34, the sensor and the magnet 38 can be positioned on the bicycle crank assembly 12 in a manner similar to that described in U.S. Pat. No. 10,475,303.

In the illustrated embodiment, the electric device further includes a second storage 40, as seen in FIG. 2. Therefore, the detecting system 26 further comprises the second storage 40 provided to the crank 16 assembly. The second storage 40 is configured to store the inclination angle transmitted by the detecting device 18 as a reference angle, as will be discussed below. The second storage 40 device is operatively coupled to the crank 16. As discussed below, the second storage 40 stores various data and/or programs that are used in connection with providing pedaling information to a rider or a user. The second storage 40 device can be a ROM (Read Only Memory) device and RAM (Random Access Memory) device or flash drive.

The bicycle electric device 14 further comprises a wireless communicator 42 that enables the bicycle electric device 14 to wirelessly communicate with the detecting device 18. Therefore, the detecting system 26 further comprising the wireless communicator 42 in electronic communication with the detecting device 18 so as to transmit a signal to the detecting device 18. The signal indicates that the crank 16 is in the predetermined position. The detecting device 18 can be programmed to automatically determine the inclination angle upon receiving the signal, as will be discussed below.

The wireless communicator 42 is preferably disposed on a printed circuit board PCB that is disposed in the housing unit 32. As mentioned above, the housing unit 32 is mounted to the bicycle crank 16. In this way, the wireless communicator 42 is operatively coupled to the bicycle crank 16. The wireless communicator 42 can be equipped with Bluetooth technology, including Bluetooth low energy, or include the wireless protocol ANT+. The bicycle electric device 14 can also include an antenna (not shown) to transmit information from the bicycle electric device 14 and to receive information from the cycle computer CC and the detecting device 18.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field. Here, the wireless communication communicator can be a two-way wireless communication unit having a receiver and a transmitter.

As shown in FIG. 2, the detecting system 26 of the illustrated embodiment preferably further comprises a cycle computer CC. The cycle computer CC is configured to wireless communicate with the bicycle electric device 14 and the detecting device 18 as discussed below. The cycle computer CC has a display that is configured to receive the angular force information calculated by detecting device 18 and is configured to display the angular force information on the display. The cycle computer CC is in communication with the detecting device 18 and/or the electric device 14 to receive information regarding the condition of the bicycle crank 16 and to display pedaling information on the display of the cycle computer CC.

In the illustrated embodiment, the detecting device 18 can include a mobile (external) device that is provided to be used with the bicycle 10. Examples of the detecting device 18 include a smartphone, a tablet or a personal computer. Preferably, as stated, the detecting device 18 includes at least one software application that is installed to detect, measure and/or send information regarding the crank angle to the second storage 40 or to the cycle computer CC. The inclinometer 22 of the detecting device 18 measures the inclination angle of the crank 16 when the crank 16 is at a predetermined position, as will be further discussed below. Therefore, the detecting system 26 further comprises the inclinometer 22 configured to detect the inclination angle of the crank 16. The electronic controller ECU is configured to determine the angle of the crank 16 based on the information relating to the image and the inclination angle.

The detecting device 18 is preferably further provided with an accelerometer A and a gyroscope G. Hereinafter, the term "inclination angle" or "inclination state" of the crank 16 refers to an angle of the bicycle crank 16 (e.g., the crank arms 16A and/or 16B) with respect to a flat plane with the bicycle 10 disposed in an upright position on a flat (level) surface, and the bicycle crank 16 is installed on the bicycle 10. The bicycle 10 can be placed on ground having an incline as long as the incline is a flat surface, as will be further discussed below.

It has been found that riders would like to be informed of the angular force components of the pedaling force during riding. In order to determine these angular force components, the inclination angle of the bicycle crank 16 may be required. The user can utilize the detecting device 18 having the inclinometer 22 to determine the inclination. The detecting device 18 is in communication with the bicycle electric device 14 and/or the cycle computer CC to transmit information regarding the calculated crank angle. The bicycle electric device 14 then transmits the information to the sensor circuit 30 that will process the information to generate angular force information related to pedaling.

Alternatively, the cycle computer CC can also include a processor that receives information from the detecting device 18 regarding the crank angle. It will be apparent to those skilled in the bicycle art from this disclosure that the various electrical components provided on the bicycle 10 and the detecting device 18 can be electric communication in a variety of ways and routes, which are not limited to the embodiment shown.

The inclinometer 22 of the detecting device 18 is capable of measuring the inclination angle or the crank angle of the crank 16 when the crank 16 is at the predetermined angular position. The inclinometer 22 is capable of measuring the angle of the crank 16 with respect to the force of gravity. External accelerations like rapid motions, vibrations or shocks can introduce errors in the tilt measurements of the inclinometer 22. Thus, the inclinometer 22 includes at least one of the accelerometer A and the gyroscope G to overcome this problem. The electronic controller ECU of the detecting device 18 includes an external device processor that is programmed to use one or both of the signals produced by the accelerometer A and the gyroscope G to obtain a value of the crank angle. The inclinometer 22 can be controlled by the electronic controller ECU to determine the inclination angle of the crank 16 once the camera 20 is operated to capture the image of the crank 16.

Thus, the electronic controller ECU of the detecting device 18 is configured to obtain information relating to the image of the crank 16 where the crank 16 is arranged at the predetermined position. That is, the electronic controller ECU is programmed to determine the inclination angle of the crank 16 from the image acquired by the camera 20. The electronic controller ECU is preferably a microcomputer that includes one or more processor and the first storage 24 (i.e., a computer memory device). The memory is any computer storage device or any computer readable medium with the sole exception of a transitory, propagating signal. For example, the memory can be nonvolatile memory and volatile memory, and can includes a ROM device, a RAM device, a hard disk, a flash drive, etc.

Figure 10:
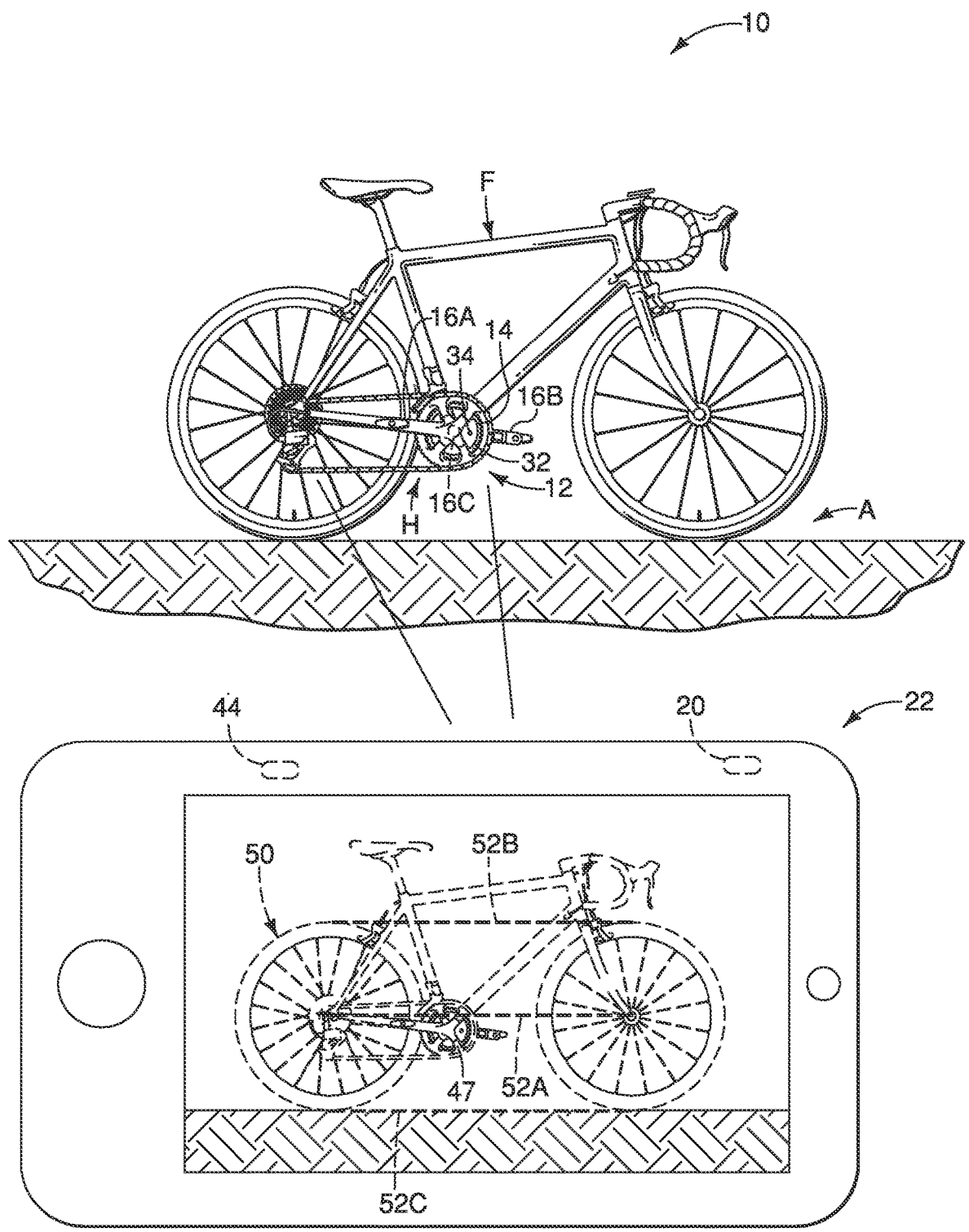
FIG. 10 is another side elevational view of the bicycle having the bicycle crank assembly that is equipped with the detecting device with the detecting device taking different information regarding the bicycle crank assembly.

As stated, the detecting device 18 includes the camera 20 configured to capture information regarding the bicycle crank 16. In particular, the camera 20 can capture an image of the crank 16 with respect to the bicycle frame F. The camera 20 can also capture an image of the crank 16 with respect to the flat ground that supports the bicycle 10, as seen in FIG. 10. Therefore, the detecting device 18 is preferably equipped with one or more sensor(s) and camera circuitry capable of capturing still and video images.

In the illustrated embodiment, the detecting device 18 further comprises a light detection and ranging detector (LIDAR 44) configured to obtain the information relating to the image. The LIDAR 44 is capable of using light to track the position of objects. Specifically, the LIDAR 44 is capable of measuring how quickly light (specifically laser light) takes to hit the object (e.g., the crank 16) and come back again, the position of that object can be determined. The LIDAR 44 is also capable of registering the angle of the reflected laser light to generate a three-dimensional image of an object that the LIDAR 44 is directed at.

The images captured by the camera 20 and the LIDAR 44 can be processed to generate images by video codec(s), and/or the processor, and/or graphics hardware, and/or a dedicated image processing unit incorporated within the camera circuitry. The images captured by the camera 20 and/or the LIDAR 44 be stored in the memory and/or the first storage 24 of the detecting device 18. The memory can include one or more different types of media used by processor, graphics hardware, and image capture circuitry to perform device functions. For example, memory may include memory cache, ROM, and/or RAM.

The first storage 24 of the detecting device 18 can be any a non-transitory computer readable medium such as a ROM device, a RAM device, a hard disk, a flash drive, etc. The first storage 24 is configured to store settings, programs, data, calculations and/or results of the processor(s). That is, the electronic controller ECU can include a program or an application that controls the camera 20 to capture the image of the bicycle crank 16 once the bicycle crank 16 is in the predetermined position and to have the processor determine the inclination angle of the crank 16 based on the image.

Figure 7:
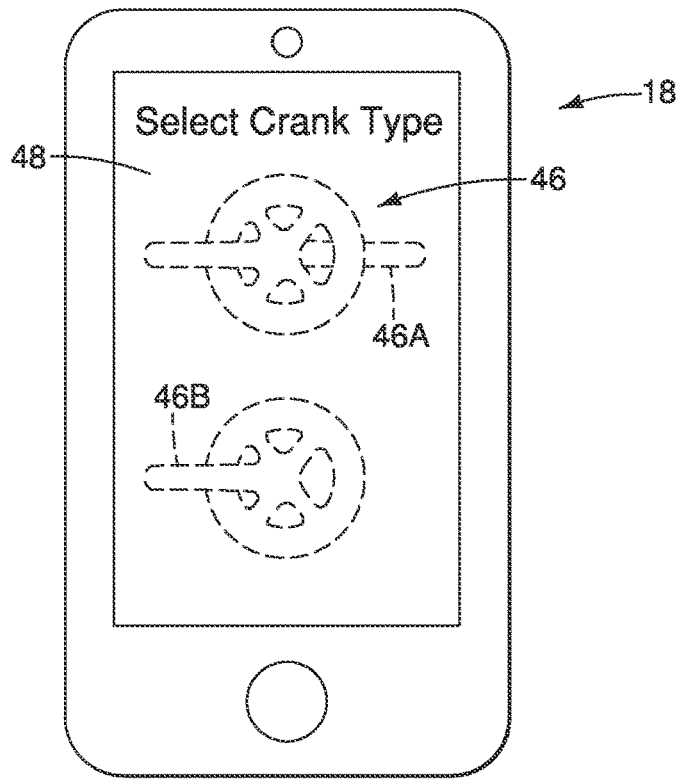
FIG. 7 is another sample screenshot of the detecting device that can be implemented with the detecting system.
Figure 9:
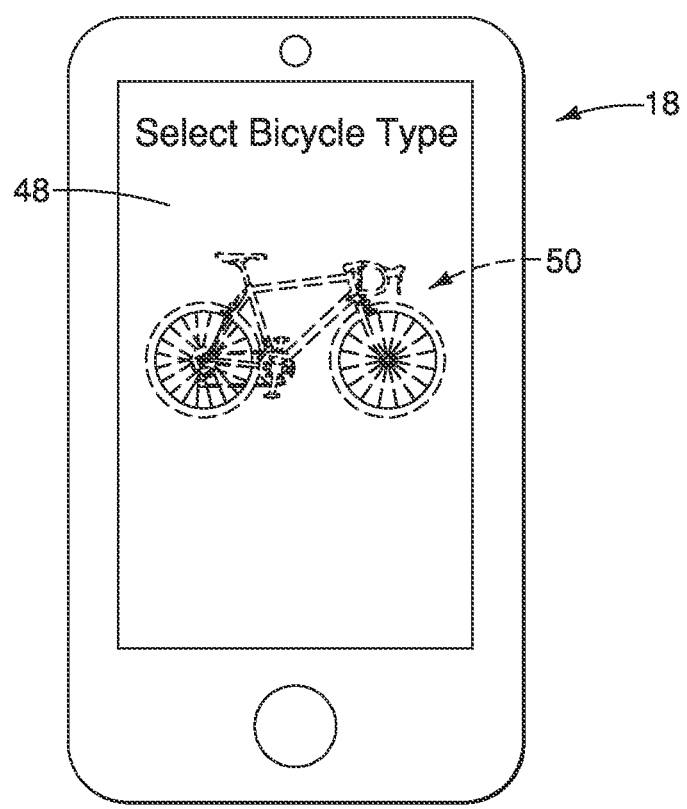
FIG. 9 is another sample screenshot of the detecting device that can be implemented with the detecting system.

In the illustrated embodiment, the first storage 24 is configured to store at least one reference image 46 of the crank 16. More particularly, the first storage 24 is configured to store a plurality of reference images 46. The reference images at least include an outer shape of the crank 16 respectively, as will be further discussed below. For example, the reference images 46 can include an outline or silhouette that corresponds to an outer shape of the bicycle crank 16, as seen in FIG. 7. The reference images 46 can further include an outer shape, outline or silhouette of the bicycle 10 with the bicycle crank 16 installed thereon, as seen in FIG. 9. Therefore, the detecting device 18 includes pre-stored reference images 46 that will be used to determine the inclination angle.

The first storage 24 can also store media (e.g., audio, image and video files), computer program instructions or software, preference information, device profile information, and any other suitable data. The memory and/or the first storage 24 can be used to retain computer program instructions or code organized into one or more modules and written in any desired computer programming language. The processor of the electronic controller ECU can execute such computer program code by implementing one or more of the methods described herein.

Therefore, the detecting device 18 preferably includes a software application that can carry out the measurements of the crank angle. Thus, the measuring of the angle of the crank 16 further includes calculating of the crank angle using the software application of the detecting device 18. As stated above, if the bicycle 10 is on an incline, the crank angle can still be calculated by compensating for the incline. For example, the software application of the detecting device 18 can be programmed to compensate for the incline. The software application can perform the compensation mechanism by measuring the actual angle of the crank 16 and also measuring the tilt angle of the bicycle 10 caused by the incline. The desired crank angle can be calculated by taking the difference of the measured actual angle and the tilt angle. Therefore, the electronic controller ECU is configured to determine the angle of the crank 16 based on the information related to the image and the information detected by the camera 20.

Figure 5:
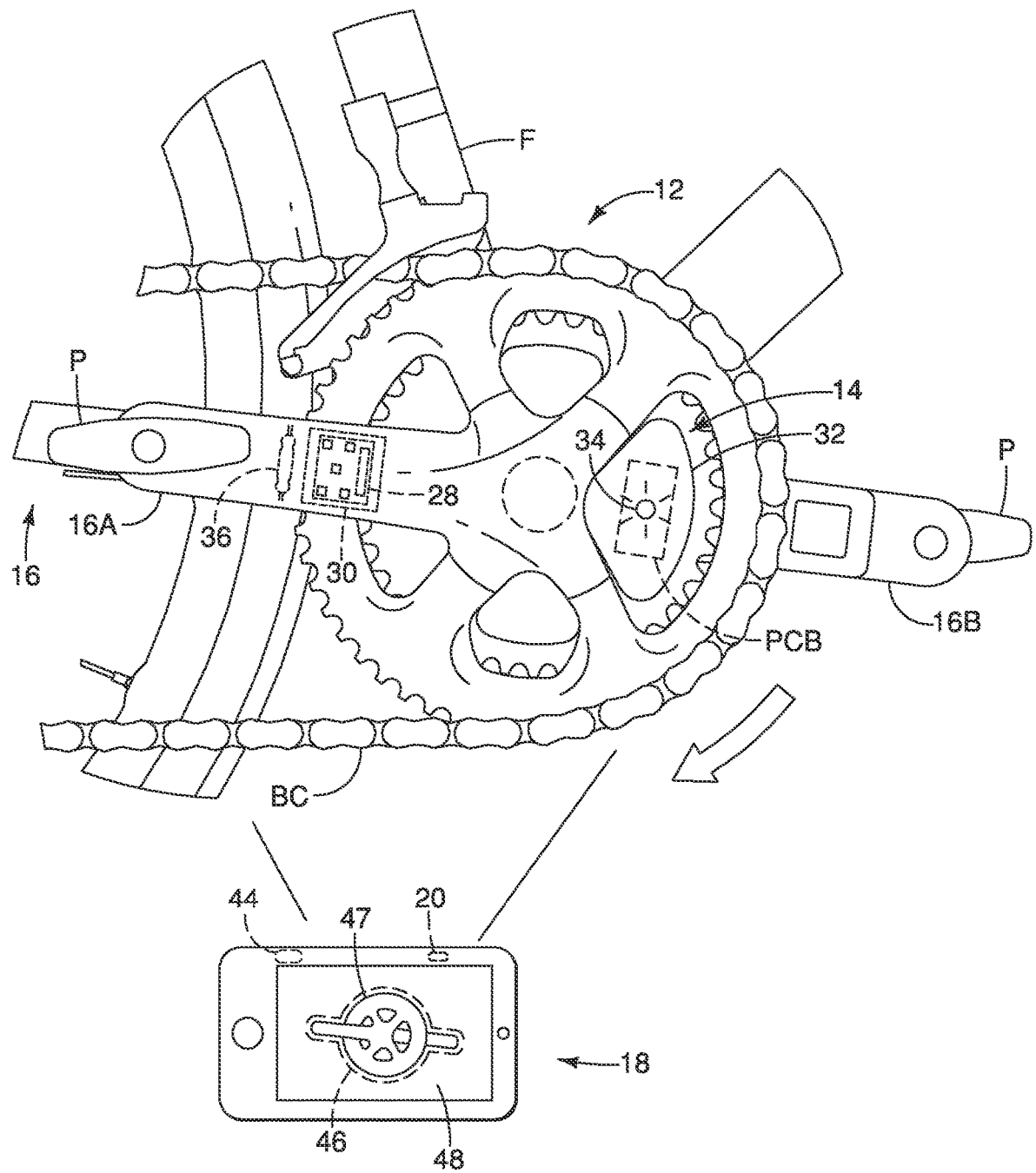
FIG. 5 is an enlarged side elevational view of the portion of the bicycle illustrated in FIG. 4, but with the right crank arm of the bicycle crank assembly being at the predetermined angular position such that the indicator produces a detection signal.
Figure 6:
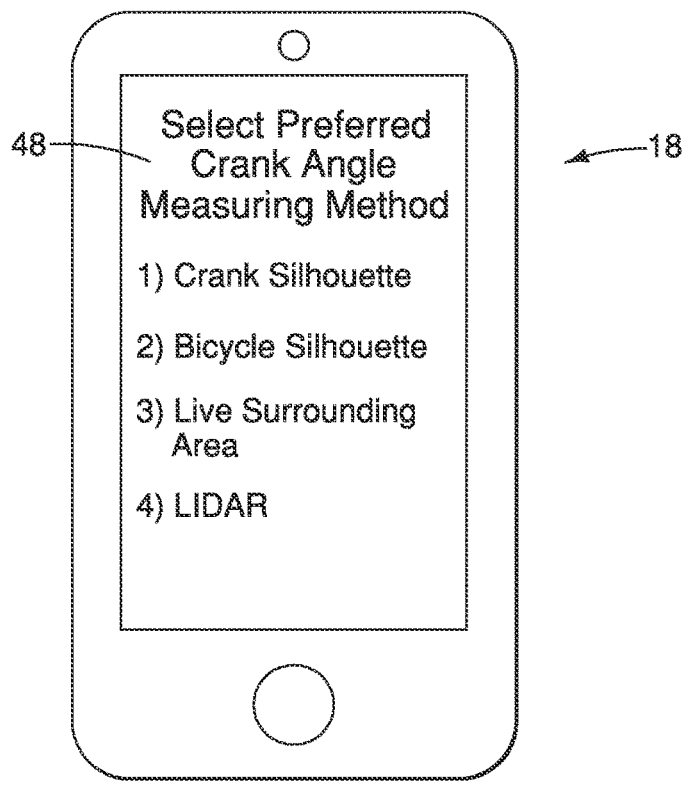
FIG. 6 is a sample screenshot of a detecting device that can be implemented with the detecting system.

As shown in FIGS. 1, 5 and 6, the detecting device 18 further includes an electronic display 48 that can display information regarding the reference images that are pre-stored in the first storage 24, and/or live images captured by the camera 20. The electronic display 48 can further display other information accessible by the processor of the electronic controller ECU. The electronic display 48 is preferably a touchscreen that is an assembly of both an input ('touch panel') and output ('display') device. The touch panel is normally layered on the top of an electronic visual display of an information processing system. The electronic display 48 can be an liquid-crystal display (LCD), active-matrix organic light-emitting diode (AMOLED) display, or an organic light-emitting (OLED) display. The user can give input or control the information processing system through multi-touch gestures by touching the screen with a special stylus or one or more fingers. The user can use the touchscreen to react to what is displayed and, if the software allows, to control how it is displayed; for example, zooming to increase the text size.

The processor of the electronic controller ECU can be any suitable programmable control device capable of executing instructions necessary to carry out or control the operation of the many functions performed by the detecting device 18 (e.g., such as the processing of images captured by the camera 20 and/or LIDAR 44). The processor can, for instance, control the electronic display 48 and receive user input from user interface which can take a variety of forms, such as a button, keypad, dial, a click wheel, keyboard, display screen and/or a touch screen. The processor can be a system-on-chip such as those found in mobile devices and include a dedicated graphics processing unit (GPU).

The processor can be based on reduced instruction-set computer (RISC) or complex instruction-set computer (CISC) architectures or any other suitable architecture and may include one or more processing cores. The detecting device 18 is preferably further equipped with graphics hardware such as special purpose computational hardware for processing graphics and/or an assisting processor to process graphics information. The graphics hardware can include one or more programmable graphics processing units (GPUs).

As stated, the electronic controller ECU is configured to determine the angle of the crank 16 based on the information acquired by the camera 20 and/or the LIDAR 44. In particular, the electronic controller ECU of the detecting device 18 is configured to detect the inclination angle of the crank 16 and is capable of defining a reference line 52 based on the image captured by the camera 20. The electronic controller ECU is configured to determine the angle based on the reference line 52 defined by the electronic controller ECU and the inclination angle that is detected by the electronic controller ECU. The electronic controller ECU is configured to determine the angle of the crank 16 based on the reference line 52 and the inclination angle, as described below.

Referring now to FIGS. 4 to 8, a method of detecting the condition of the bicycle crank assembly 12 will now be discussed. In particular, referring specifically to FIGS. 4 and 8, a method of arriving at the predetermined position of the crank 16 will now be discussed. In the illustrated embodiment, the predetermined position of the crank 16 is a detecting state of the crank 16. That is, the method comprises detecting the detecting state where the crank 16 is arranged at a predetermined position with respect to the bicycle frame F. Therefore, the detecting device 18 of the illustrated embodiment is configured to determine the inclination angle of the crank 16 in detecting state.

As seen in FIGS. 4 and 5, the user rotates the crank 16 to the predetermined angular position in step S1. In the illustrated embodiment, the reaching of the predetermined position is determined by the position sensor 36 that is provided on the crank 16. For example, the user can rotate the crank 16 from the position of FIG. 4 to the position of FIG. 5, which is an illustration of the predetermined position of the crank 16. Therefore, the method for detecting the condition of the bicycle crank assembly 12 comprises detecting the predetermined position using the sensor 36 provided to the bicycle crank assembly 12. In other words, the method comprises detecting the detecting state where the crank 16 is arranged at the predetermined position with respect to the bicycle frame F.

As stated, the position sensor 36 is actuated by the magnet 38, which is mounted on the bicycle frame F. In particular, when the position sensor 36 is within proximity of the magnet 38, the electronic indicator 34 indicates that the predetermined angular position has been reached. Thus, in step S2, the user receives an indication indicating that the crank 16 is at the predetermined angular position. The indication can be in many forms. For example, the indication can comprise lighting. The indication can also comprise a sound indication. The indication can also comprise a combination of lighting and sound indication. Therefore, the method for detecting the condition of the bicycle crank assembly 12 further comprises receiving the indication from the electronic indicator 34. The indication indicates that the crank 16 is in the predetermined position. Therefore, the predetermined position is a position in which the electronic indicator 34 generates the indication.

In step S3, the user stops rotation of the crank 16 upon reaching the predetermined angular position. Now, the electronic indicator 34 sends the indication, and the user knows to maintain the crank 16 in the predetermined angular position.

Steps S1 to S3 comprise the method of arriving at the predetermined position of the crank 16 that is the detecting state of the crank 16. In the illustrated the method for detecting the condition of the bicycle crank assembly 12 preferably further comprises obtaining an information relating to an image of the crank 16 with respect to the bicycle frame F using the detecting device 18 in the detecting state where the crank 16 is arranged at the predetermined position with respect to the bicycle frame F.

In particular, the method can include a plurality of inclination angle determination methods, as seen in FIG. 6. That is, the electronic controller ECU of the detecting device 18 can be preprogrammed with one or more software applications for the user to select a preferred way of determining the crank angle. As shown in FIG. 6, the electronic controller ECU can be preprogrammed with at least four ways or methods of determining the inclination of the crank 16 using the detecting device 18. However, it will be apparent to those skilled in the art from this disclosure that the electronic controller ECU of the detected device is not limited to the methods listed. Thus, it will be apparent to those skilled in the bicycle field from this disclosure that the detecting device 18 can be programmed with additional methods of determining the crank 16 when the crank 16 is in the predetermined position as needed and/or necessary.

For example, the user can select using a crank silhouette, shape or outline for determining the inclination of the crank 16. Therefore, the detecting system 26 proceeds to step S51 in which the user receives the reference image 46. Thus, the method for detecting the condition of the bicycle crank assembly 12 further comprises using the detecting device 18 to access the reference image 46 of the crank 16 after receiving the indication. As stated, the reference image(s) 46 are prestored in the first storage 24 of the detecting device 18 and can include a crank silhouette, shape or outline, such as that shown in FIG. 6. Thus, the reference image is accessed from the first storage 24 of the detecting device 18.

As seen in FIG. 7, the electronic display 48 is configured to display at least one of a plurality of the reference images 46A (two examples of references images 46A and 46B are illustrated in FIG. 7). In particular, the first storage 24 can include different types or models of crank assemblies such that the user can select the appropriate crank model that corresponds with the crank 16 that is installed to the bicycle 10, though only two are illustrated for simplicity. Thus, the electronic display 48 is configured to display at least one of the plurality of the reference images 46. As shown, the electronic controller ECU is configured to control the electronic display 48 to display the first reference image 46A that is selected from the plurality of reference images 46. Thus, the electronic controller ECU is configured to control the electronic display 48 to display the first reference image 46A that was selected from the plurality of reference images 46 displayed in FIG. 6 on the screen in FIG. 7 to compare the first reference image 46A with the live image 47 of the crank 16.

Therefore, the electronic display 48 will display the reference image 46 with a live image 47 of the crank 16 that is being captured by the camera 20, such as seen in FIG. 5. The method for detecting the condition of the bicycle crank assembly 12 further comprises displaying the live image 47 of the crank 16 with the reference image 46A concurrently on the electronic display 48 provided to the detecting device 18, as seen in FIG. 5. In other words, the electronic controller ECU of the detecting device 18 is configured to concurrently display the at least one reference image 46A and the live image 47 of the crank 16 prior to capturing the image of the crank 16.

In step S51A, the user will align the live image 47 of the crank 16 screened by the camera 20 with the reference image 46A on the electronic display 48. For example, as shown in FIG. 5, the live image 47 and the reference image 46A are substantially aligned on the electronic display 48. Thus, the method for detecting the condition of the bicycle crank assembly 12 further comprises comparing the reference image 46A with the live image 47 of the crank 16 using the detecting device 18.

In step S6, once the reference image 46 and the live image 47 are aligned or substantially aligned, the camera 20 can capture the image of the crank 16. The camera 20 can be configured to automatically capture the image once the detecting device 18 senses that the reference image 46 and the live image 47 are aligned or substantially aligned. Alternatively, the user can capture the image by operating the camera 20.

In step S7, the inclination angle is measured using the detecting device 18 based on the information related to the image of the crank 16 that was captured by the camera 20. In the illustrated embodiment, measuring of the angle of the crank 16 includes using the detecting device 18 while the crank 16 is in the predetermined angular position. As stated, the inclinometer 22 is configured to detect the inclination angle of the crank 16. The electronic controller ECU is configured to determine the inclination angle of the crank 16 with respect to the bicycle frame F based on the information obtained by the electronic controller ECU and the inclination angle. Thus, the measuring of the inclination angle of the crank 16 preferably further includes calculating of the crank angle using software application of the detecting device 18.

In step S8, the user then transmits information with respect to the angle of the crank 16 using the detecting device 18 to the crank 16 which has the second storage 40 that will store the inclination angle as a reference angle. Therefore, the detecting device 18 is configured to transmit the inclination angle to the second storage 40 device that is provided to the bicycle crank 16. The second storage 40 is configured to store the inclination angle as the reference angle. The reference angle will be used by the sensor circuit to determine the strain forces acting on the bicycle pedals P. In the illustrated embodiment, the crank 16 is an example of a bicycle component having the storage device that can receive the crank angle information. It will be apparent to those skilled in the art from this disclosure that the condition of the bicycle crank 16 can be transmitted to another bicycle component having a storage. For example, the detecting device 18 can transmit the crank angle information to the cycle computer CC for displaying on the display of the cycle computer CC.

Figure 8:
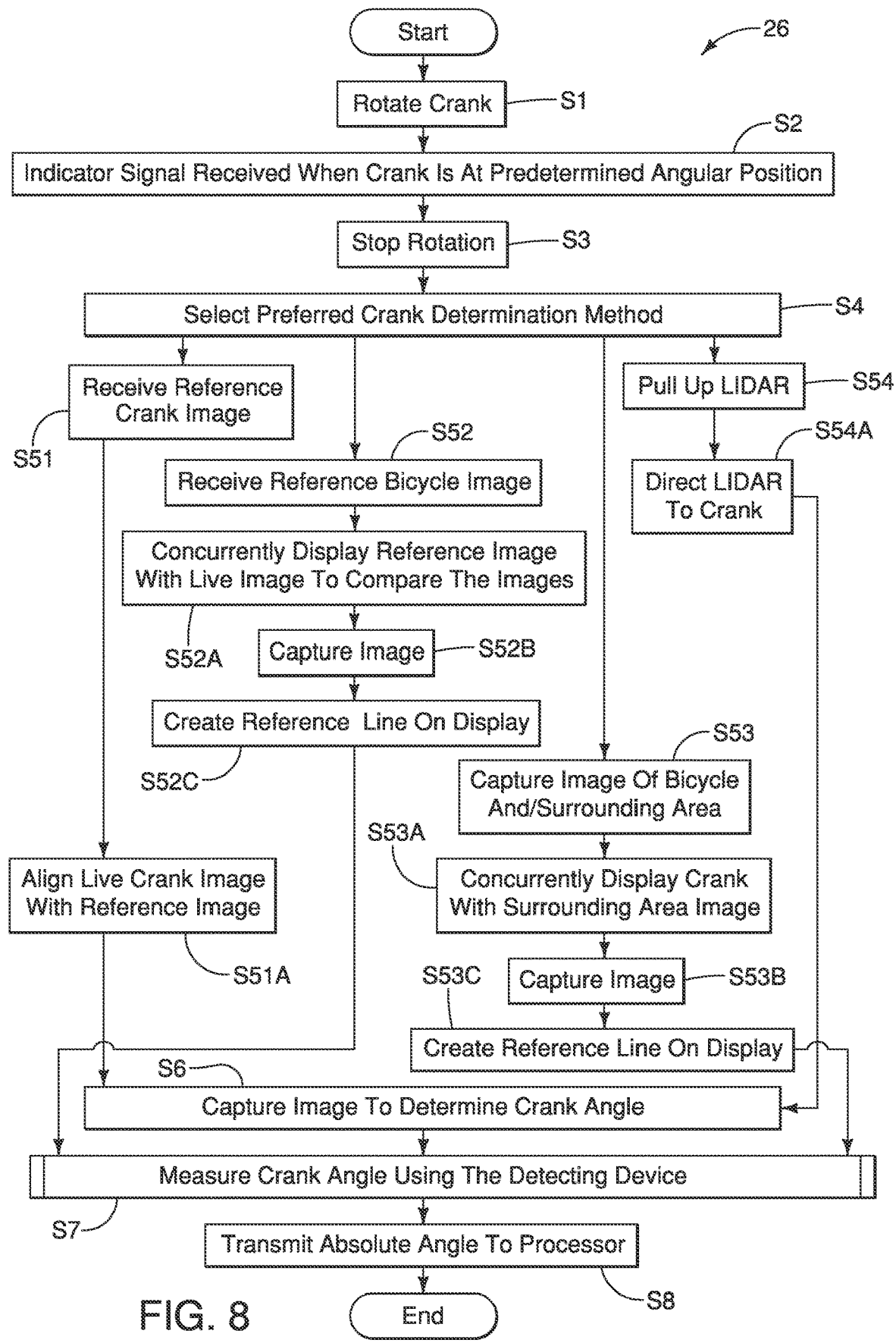
FIG. 8 is a flow chart illustrating the steps of the detecting system.

Referring to FIGS. 8 to 10, after steps S1 to S3, the user can select another preferred way of determining the crank angle from the methods that are listed in FIG. 6. For example, the user can select using a bicycle silhouette, shape or outline for determining the inclination of the crank 16. Therefore, the detecting system 26 proceeds to step S53 in which the user can receives a reference image 50 that includes a bicycle silhouette, shape or outline. The reference image 50 of the bicycle 10 can be prestored in the first storage 24 of the detecting device 18 and can include a bicycle silhouette, shape or outline, such as that shown in FIG. 9. Alternatively, in this method, the reference image 50 can be a live image that is detected by the camera 20 in step S52. Thus, step S52 includes either accessing the reference image 50 from the first storage 24 or detecting the reference image 50 as a live image using the camera 20.

In step S52A, the detecting system 26 will concurrently display the reference image 50 of the bicycle outline concurrently with a live image 47 of the crank 16 that is detected by the camera 20, as seen in FIG. 10. Therefore, the electronic display 48 displays the reference image 50 of the bicycle outline concurrently with the live image of the crank 16. In particular, the electronic display 48 concurrently displays the reference image 50 and the live image 47 of the crank 16 prior to capturing the image of the crank 16. By concurrently displaying the images 47 and 50 of the crank 16 and the bicycle 10 on the electronic display 48, the detecting system 26 can compare the reference image 50 of the bicycle 10 with the live image 47 of the bicycle 10 having the crank 16 using the electronic detecting device 18.

In step S52B, the camera 20 can capture the image of the crank 16. The user can capture the image by operating the camera 20. In step S52C, the user creates a reference line 52 for the detecting device 18. In particular, the user creates the reference line 52 on the electronic display 48 after the camera captures the image of the crank 16, as seen in FIG. 10. The inclination angle of the crank 16 can be determined based on the reference line 52. As seen in FIG. 10, the reference line 52 can be created on the bicycle frame F. For example, the reference line 52 can include a first reference line 52A that connects the axles of the front and rear wheels in a straight line. The reference line 52 can include a second reference line 52B that connects two corresponding portions of the front and rear wheels (e.g., a top point of the front and rear wheels), as seen in FIG. 10.

Therefore, the method for detecting the condition of the bicycle crank assembly 12 further comprises creating a reference indication that includes creating the reference line 52 on the electronic display 48. Alternatively speaking, the method further comprises creating the reference indication (e.g., the reference line 52) on the detecting device 18. Thus, the electronic control is configured to detect the inclination angle of the crank 16 and define the reference line 52 based on the image received by the camera 20. It will be apparent to those skilled in the bicycle art from this disclosure that the reference line 52 can also include additional reference lines or reference indications connecting different parts of the bicycle 10 just so long as the reference line 52 forms a flat plane on the electronic display 48.

Next, the detecting system 26 proceeds to step S7, which the crank angle is measured using the detecting device 18, as described for step S7 above. The method for detecting the condition of the bicycle crank assembly 12 further comprises measuring the inclination angle using the detecting device 18 based on the information and the reference indication.

In particular, the electronic controller ECU of the detecting device 18 can be programmed with a protractor that can calculate or detect the angle between the crank 16 and the reference line 52 to determine the angle of the crank 16. Thus, the electronic controller ECU of the detecting device 18 is configured to detect the inclination angle of the crank 16 and define the reference line 52 based on the image captured by the camera 20. In step S8, the user then transmits information with respect to the angle of the crank 16 from the detecting device 18 to the crank 16 which has the second storage 40 device that will store the crank angle information, as described for step S8, above.

Referring to FIGS. 8 and 10, after steps S1 to S3, the user can select another preferred way of determining the crank angle from the methods that are listed in FIG. 6. For example, the user can select using a live image of the surrounding area A of the bicycle 10 for determining the inclination of the crank 16. In step S53, the user can receive an image (similar to the reference image 50) of the bicycle silhouette, shape or outline along with a surrounding area A of the bicycle 10. In the illustrated embodiment, the surrounding area A of the bicycle 10 will at least include a surface on which the bicycle 10 sits in an upright condition, as seen in FIG. 10. In particular, the camera 20 can detect the image of the surrounding area A in step S53.

In step S53A, the detecting system 26 will concurrently display the surrounding area A of the bicycle concurrently with a live image (similar to the live image 47) of the crank 16 on the electronic display 48, as seen in FIG. 10. Therefore, the electronic display 48 displays the surrounding area A having the bicycle 10 concurrently with the live image 47 of the crank 16. In particular, the electronic display 48 displays the live image 47 of the surrounding area A concurrently with the live image of the crank 16.

In step S53B, the camera 20 can capture the image of the surrounding area A. The user can capture the image by operating the camera 20. In step S53C, the user creates a third reference line 52C on the electronic display 48 on the captured image, such as the third reference line 52C seen in FIG. 10. The inclination angle of the crank 16 can be determined based on the third reference line 52C. As seen in FIG. 10, the third reference line 52C can be drawn along the surface of the ground on which the bicycle 10 sits. Therefore, in step S53B, the reference line 52C is created on the surrounding area A, with the reference line 52C being considered a reference indication, similar to that described in steps S52 to S52B above.

The detecting system 26 then proceeds to step S7 in which the crank angle is measured using the detecting device 18, as described for step S7 above. The method for detecting the condition of the bicycle crank assembly 12 further comprises measuring the inclination angle using the detecting device 18 based on the information and the reference indication. Thus, the electronic controller ECU of the detecting device 18 is configured to detect the inclination angle of the crank 16 and define the reference line based on the image captured by the camera 20. The electronic controller ECU can similarly use the programmed protractor to determine the angle of the crank 16 with respect to the reference line 52C.

In step S8, the user then transmits information with respect to the angle of the crank 16 from the detecting device 18 to the crank 16 which has the second storage 40 device that will store the crank angle information, as described for step S8, above.

Referring to FIG. 8, after steps S1 to S3, the user can select another preferred way of determining the crank angle from the methods that are listed in FIG. 6. For example, the user can select using LIDAR 44 of the detecting device 18 for determining the inclination of the crank 16. In step S54, the user accesses the LIDAR 44 system of the detecting device 18. Then, in step S54A the user directs the LIDAR 44 to the crank 16 of the bicycle crank assembly 12. Therefore, the method for detecting the condition of the bicycle crank assembly 12 further comprises accessing the LIDAR 44 on the detecting device 18 to measure the inclination angle of the crank 16. As stated, the LIDAR 44 can create an image of the crank 16 based on the distance from the detecting device 18 to the crank 16. Thus, the inclination angle is determined based on the image of the crank 16 created by the LIDAR 44. In step S6, the processor of the electronic controller ECU can create/capture an image of the crank 16 based on the information received by the LIDAR 44.

In step S7, the crank angle is measured using the detecting device 18, as described for step S7 above. In step S8, the user then transmits information with respect to the angle of the crank 16 from the detecting device 18 to the crank 16 which has the second storage 40 device that will store the crank angle information, as described for step S8, above.

Figure 11:
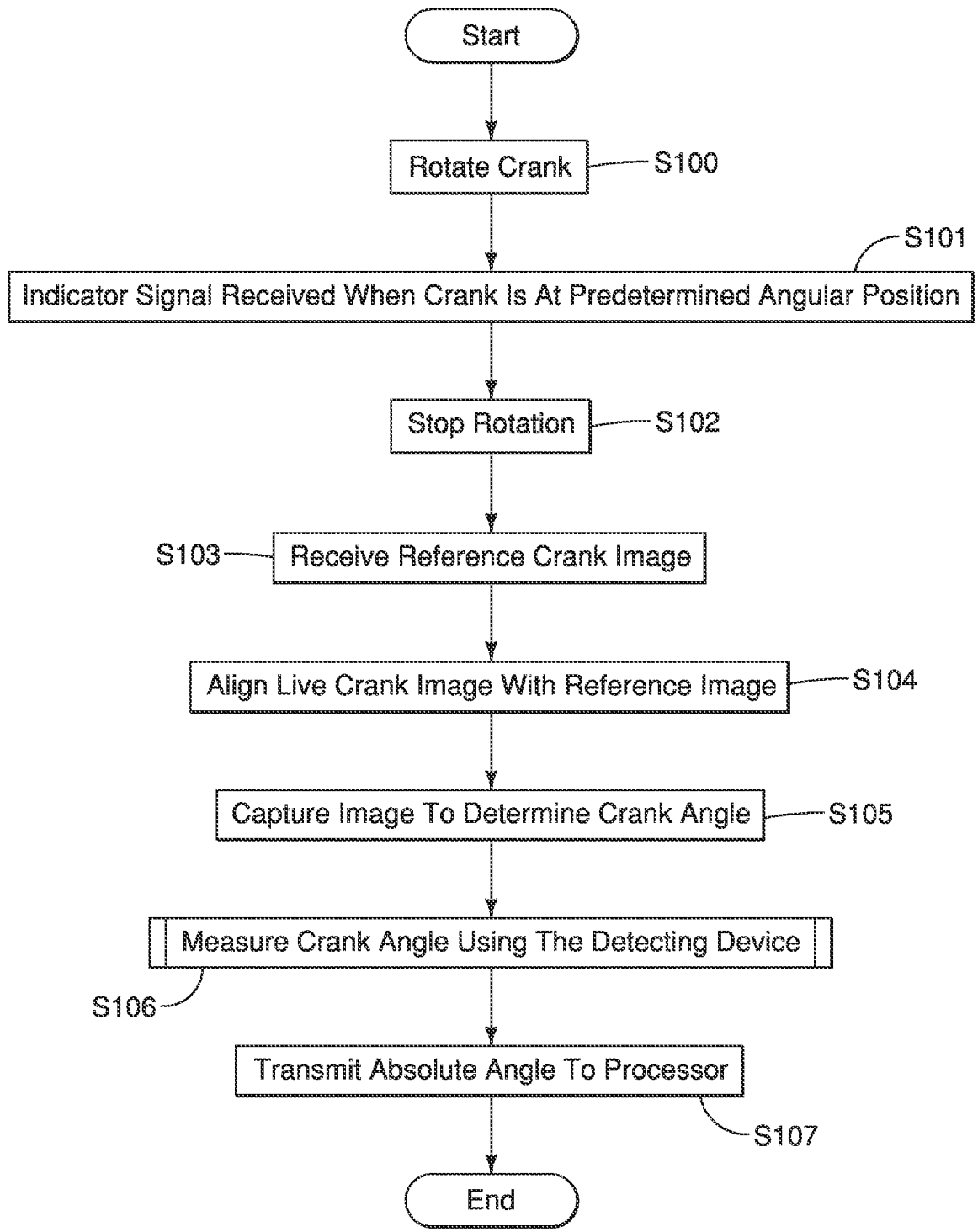
FIG. 11 is a flow chart illustrating a first default method of the detecting system.

In the illustrated embodiment, the electronic controller ECU of the detecting device 18 can alternatively be programmed to determine the crank angle by a default method. That is, the user does not select a preferred crank angle measuring method, as seen in FIG. 6. Rather, the detecting system 26 proceeds directly to a default program. As seen in FIG. 11, a first set of default steps are illustrated: S100, S101, S102, S103, S104, S105, S106 and S107. Steps 100 to S107 correspond to the steps S1, S2, S3, S51, S51A, S6, S7 and S8, of FIG. 8 respectively and will not be further described for brevity. The electronic controller ECU can be preprogrammed with the set of default steps to determine the crank angle.

Figure 12:
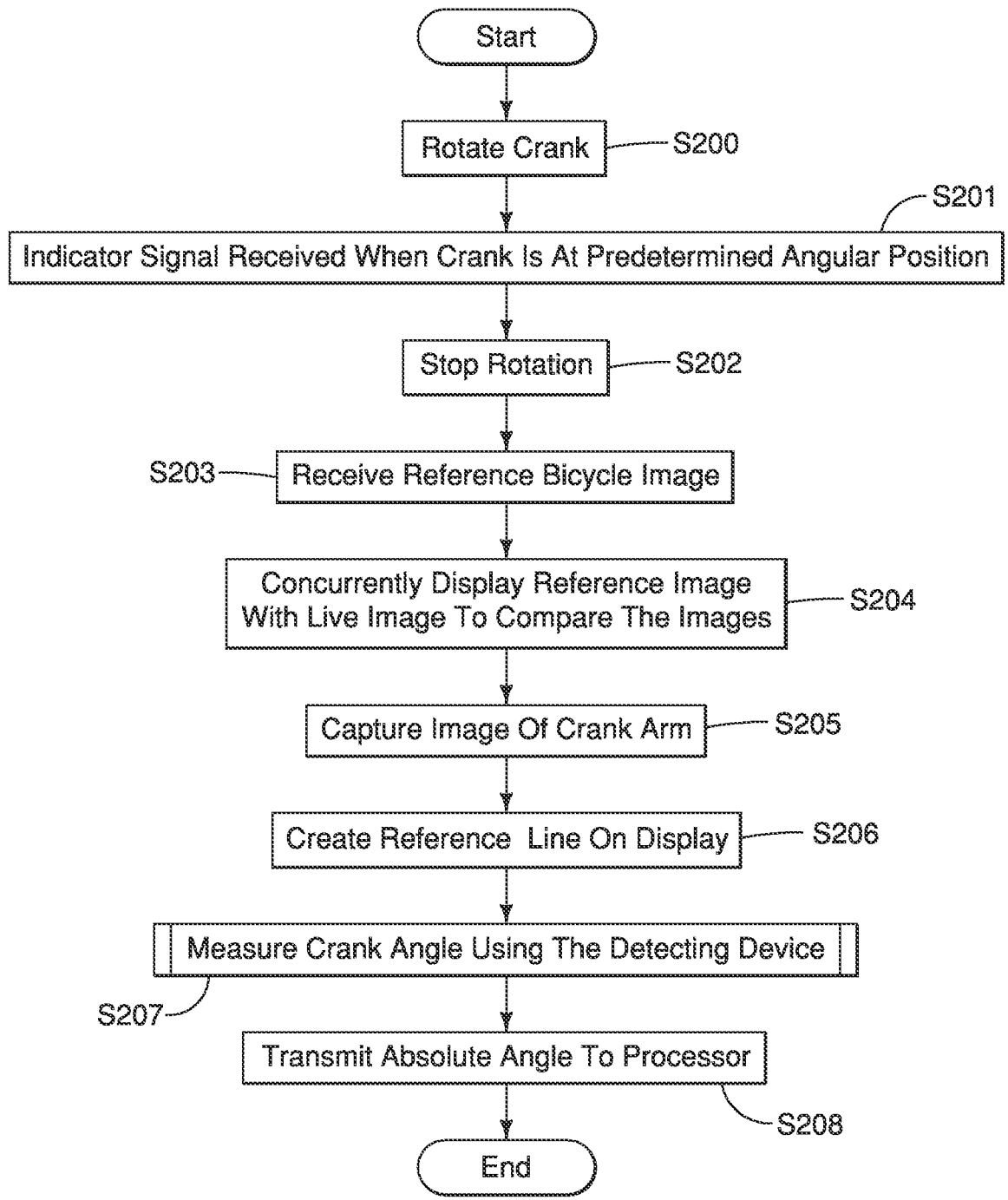
FIG. 12 is a flow chart illustrating a second default method of the detecting system.

As seen in FIG. 12, a second set of default steps are illustrated: S200, S201, S202, S203, S204, S205, S206, S207 and S208. Steps 200 to S208 correspond to the steps S1, S2, S3, S52, S52A, S52B, S52C, S7 and S8, of FIG. 8, respectively. The electronic controller ECU can be preprogrammed with the second set of default steps to determine the crank angle.

Figure 13:
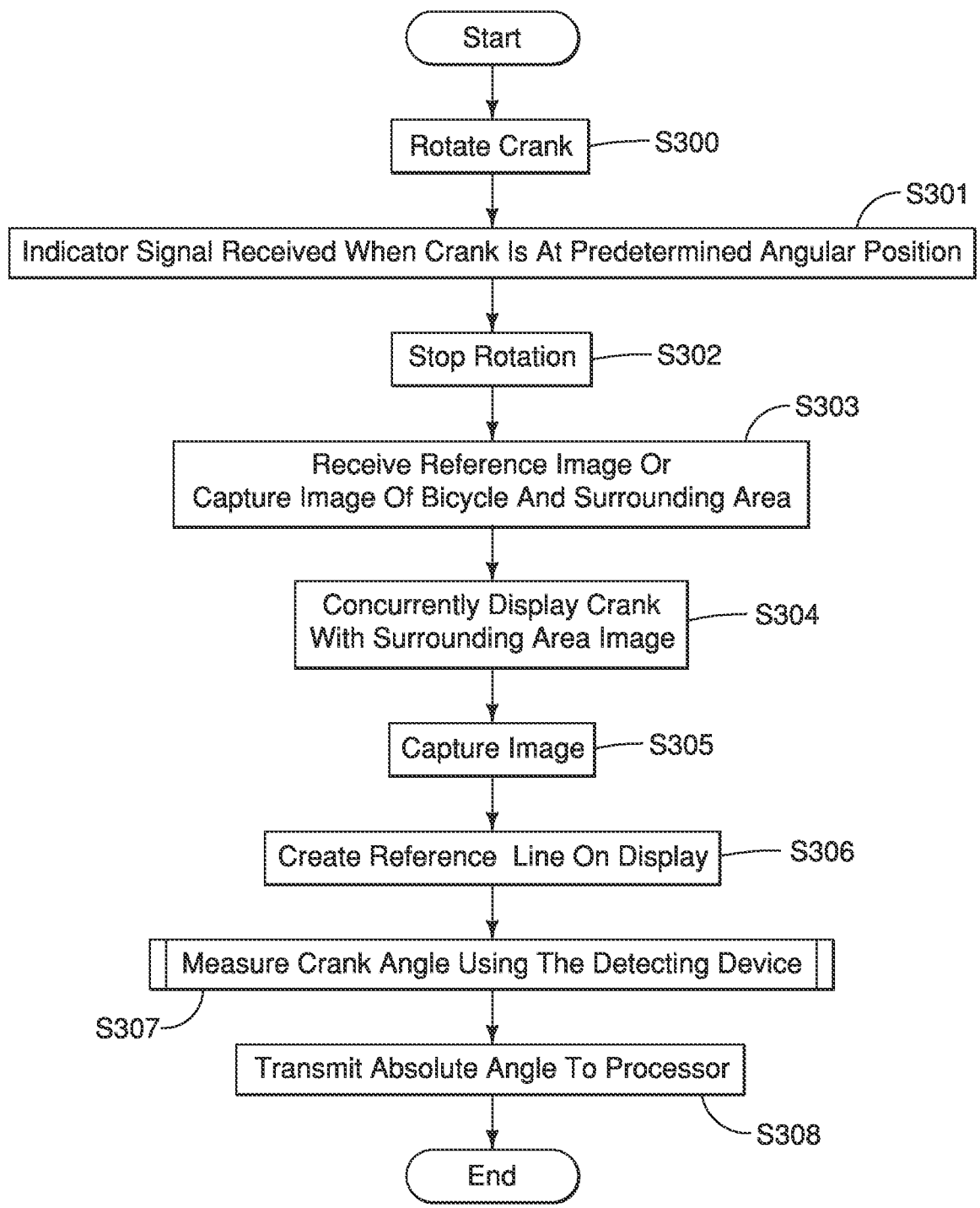
FIG. 13 is a flow chart illustrating a third default method of the detecting system.

As seen in FIG. 13, a third set of default steps are illustrated: S300, S301, S302, S303, S304, S305, S306, S307 and S308. Steps S300 to S308 correspond to steps S1, S2, S3, S53, S53A, S53B, S53C, S7 and S8 of FIG. 8, respectively. The electronic controller ECU can be preprogrammed with the third set of default steps to determine the crank angle.

Figure 14:
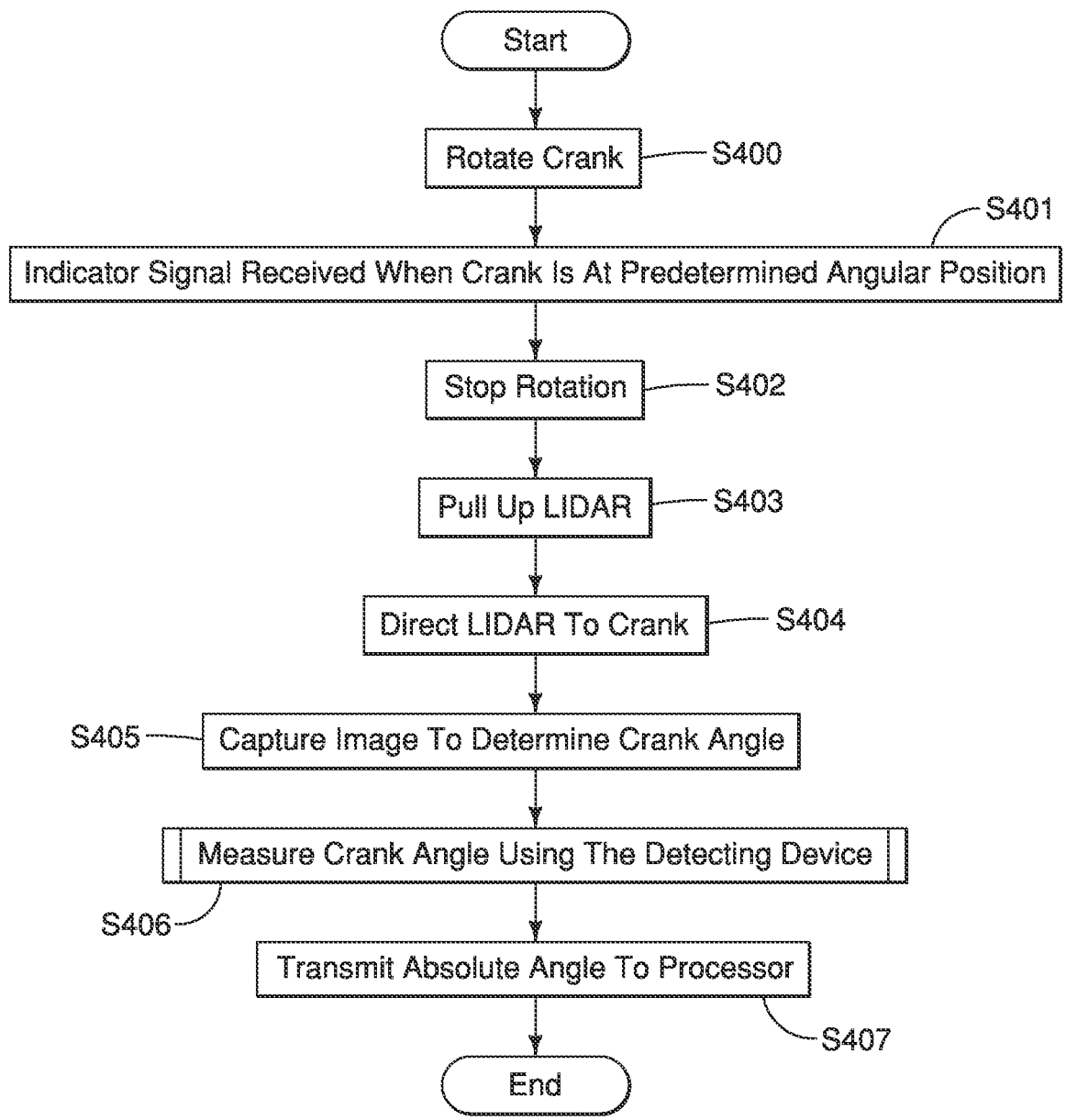
FIG. 14 is a flow chart illustrating a fourth default method of the detecting system.

As seen in FIG. 14, a fourth set of default steps are illustrated: S400, S401, S402, S403, S404, S405, S406 and S407. Steps S400 to S407 correspond to steps S1, S2, S3, S54, S54A, S6, S7 and S8 of FIG. 8, respectively. The electronic controller ECU can be preprogrammed with the fourth set of default steps to determine the crank angle.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the detecting system. Accordingly, these directional terms, as utilized to describe the detecting system should be interpreted relative to a bicycle in an upright riding position on a horizontal surface and that is equipped with the detecting system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present disclosure. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present disclosure are provided for illustration only, and not for the purpose of limiting the invention as defined by the appended claims and their equivalents.

What is claimed is:

1. A detecting device for detecting a condition of a bicycle crank assembly
   including a bicycle crank provided to a bicycle frame, the detecting device comprising:
   an electronic controller configured to obtain information relating to an image of the crank, the electronic controller being configured to determine an angle of the crank based on the information and at least one reference image prestored in a first storage.

2. The detecting device according to claim 1, further comprising
   an inclinometer configured to detect an inclination angle of the crank, wherein
   the electronic controller is configured to determine the angle of the crank based on the information relating to the image and the inclination angle.

3. The detecting device according to claim 1, wherein
   the electronic controller is configured to detect an inclination angle of the crank and define a reference line based on the image, and
   the electronic controller is configured to determine the angle based on the reference line and the inclination angle.

4. The detecting device according to claim 1, further comprising
   a light detection and ranging detector configured to obtain the information relating to the image.

5. The detecting deice according to claim 1, further comprising
   a camera configured to capture the image of the crank With respect to the bicycle frame.

6. The detecting device according to claim 5, further comprising
the first storage configured to store the at least one reference image of the crank, and
an electronic display configured to concurrently display the at least one reference image and a live image of the crank prior to capture the image of the crank.

7. The detecting device according to claim 4, further comprising
the first storage configured to store a plurality of reference images at least including an outer shape of the crank respectively, and
an electronic display configured to display at least one of the plurality of the reference images, the electronic controller being configured to control the electronic display to display a first reference image selected from the plurality of reference images.

8. A detecting system for a bicycle crank assembly including a bicycle crank provided to a bicycle frame, the detecting system comprising:
the detecting device according to claim 1; and
a sensor provided to the crank, the sensor being configured to detect an object provided to the bicycle frame in a detecting state where the crank is arranged at a predetermined position with respect to the bicycle frame, wherein
the detecting device is configured to determine an inclination angle of the crank in detecting state.

9. The detecting system according to claim 8, further comprising
a second storage provided to the crank assembly, wherein
the detecting device is configured to transmit the inclination angle to the second storage device, the second storage being configured to store the inclination angle transmitted by the detection device as a reference angle.

10. The detecting system according to claim 8, further comprising
an electronic indicator configured to indicate that the crank is in the predetermined position.

11. The detecting system according to claim 8, further comprising
a wireless communicator in electronic communication with the detecting device so as to transmit a signal to the detecting device, the signal indicating that the crank is in the predetermined position.

12. The detecting system according to claim 11, wherein
the detecting device is configured to automatically determine the inclination angle upon receiving the signal.

13. A method for detecting a condition of a bicycle crank assembly including a bicycle crank provided to a bicycle frame, the method comprising:
detecting a detecting state where the crank is arranged at a predetermined position with respect to the bicycle frame,
obtaining an information relating to an image of the crank with respect to the bicycle frame using a detecting device in the detecting state where the crank is arranged at the predetermined position with respect to the bicycle frame; and
measuring an inclination angle of the crank using the detecting device based on e information and at least one reference image prestored in a first storage.

14. The method according to claim 13, further comprising
detecting the predetermined position using a sensor provided to the bicycle crank assembly.

15. The method according to claim 14, further comprising
accessing a light detection and ranging detector on the detecting device to measure the inclination angle of the crank.

16. The method according to claim 14, further comprising
transmitting the inclination angle to a second storage provided to the bicycle crank using the detecting device, the second storage configured to store the inclination angle as a reference angle.

17. The method according to claim 14, further comprising
creating a reference indication for the detection device, and
measuring the inclination angle using the detecting device based on the information and the reference indication.

18. The method according to claim 17, wherein
creating the reference indication includes creating a reference line on an electronic display provided to the detecting device, the electronic display further displaying a reference image of a bicycle outline concurrently with the live image of the crank, the reference line being created on the bicycle frame.

19. The method according to claim 17, wherein
creating the reference indication includes creating a reference line on an electronic display provided to the detecting device, the electronic display further displaying a live image of a surrounding area concurrently with the live image of the crank, the reference line being created on the surrounding area.

20. The method according to claim 13, further comprising
receiving an indication from an electronic indicator, the indication indicating that the crank is in the predetermined position, the predetermined position being a position in which the electronic indicator generates the indication.

21. The method according to claim 20, further comprising
using the detecting device to access the reference image of the crank after receiving the indication.

22. The method according to claim 20, wherein
the reference image is accessed from the first storage of the detecting device.

23. The method according to claim 22, further comprising
comparing the reference image with a live image of the crank using the detecting device.

24. The method according to claim 23, further comprising
displaying the live image of the crank with the reference image concurrently on an electronic display provided to the detecting device.

* * * * *